United States Patent [19]
Ralston

[11] 3,754,997
[45] Aug. 28, 1973

[54] ELECTRIC BATTERY CELL WITH A PLASTIC TOP HAVING A SPRING PRESSURE SEAL

[75] Inventor: Robert E. Ralston, Spring Valley, N.Y.

[73] Assignee: P. R. Mallory & Co., Inc., Indianapolis, Ind.

[22] Filed: June 16, 1971

[21] Appl. No.: 153,494

[52] U.S. Cl. .............................................. 136/107
[51] Int. Cl. .......................................... H01m 21/00
[58] Field of Search................... 136/107, 102, 83.6; 220/55 AN

[56] References Cited
UNITED STATES PATENTS

| | | | |
|---|---|---|---|
| 3,615,860 | 10/1971 | Terlecke............................ | 136/107 |
| 3,016,414 | 1/1962 | Priebe................................ | 136/107 |
| 3,660,168 | 5/1972 | Ralston et al...................... | 136/107 |
| 3,663,301 | 5/1972 | Ralston et al...................... | 136/107 |
| 3,096,217 | 7/1963 | Clune................................. | 136/107 |
| 2,704,780 | 3/1955 | MacFarland....................... | 136/107 |
| 3,016,414 | 1/1962 | Prube................................. | 136/107 |
| 1,303,175 | 5/1919 | Draper............................... | 220/55 AN |
| 1,615,442 | 1/1927 | Davies................................ | 220/55 AN |

*Primary Examiner*—A. B. Curtis
*Assistant Examiner*—C. F. LeFevour
*Attorney*—Robert Levine

[57] ABSTRACT

An electric cell with a plastic top closure as a circular disc that has a peripheral co-axial and concentric plastic border ring with a pre-stressed convoluted metal spring ring disposed within the plastic ring to establish permanent radially outward pressure against the plastic border ring, which is crimped over the metal ring by the crimped end of the container can. The spring convolution serves additionally as a rigid backing element for an additional pressure force on the plastic border ring, to prevent or limit unsealing effects that could arise from cold flow and creepage of the plastic ring.

18 Claims, 4 Drawing Figures

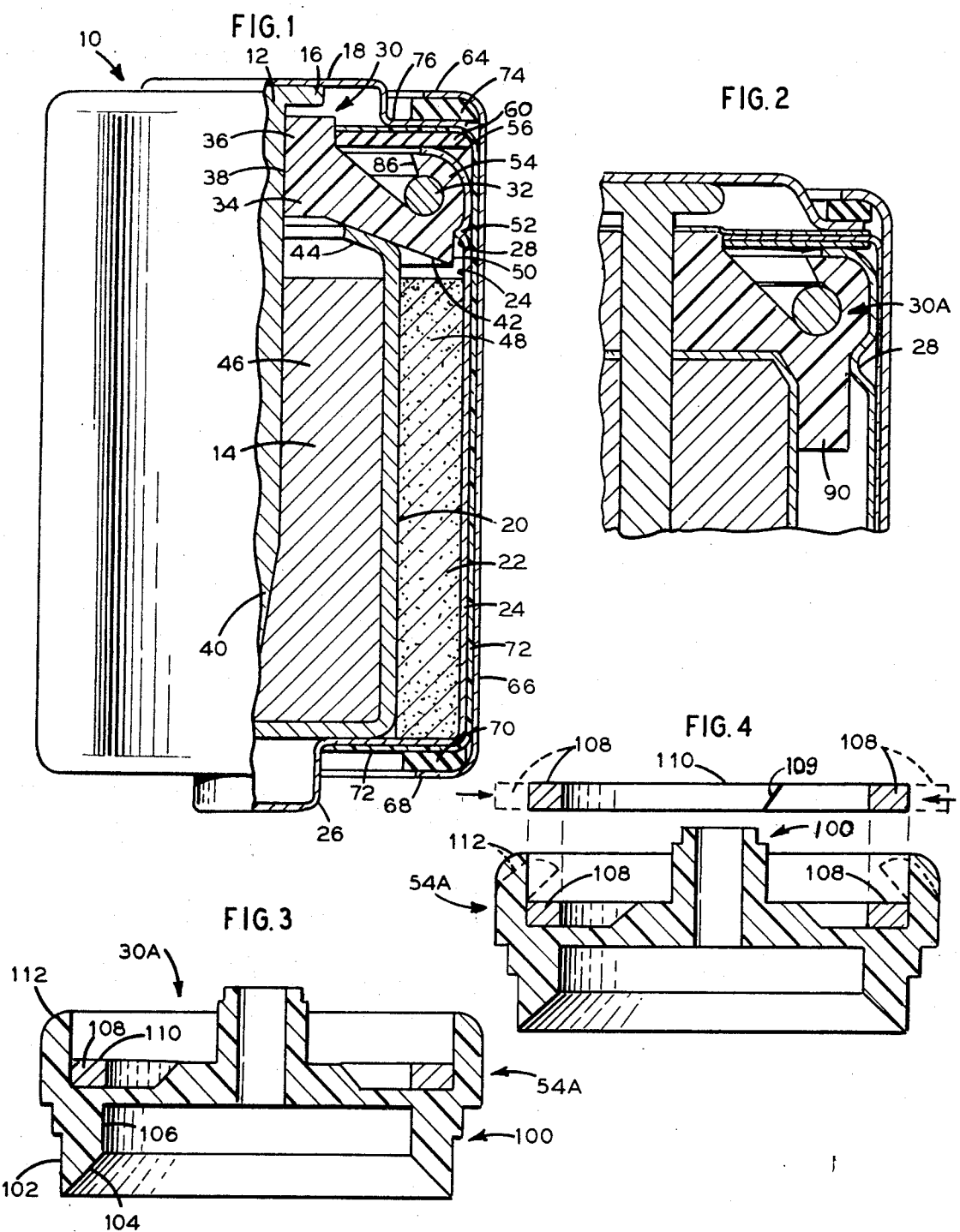

1

ELECTRIC BATTERY CELL WITH A PLASTIC TOP HAVING A SPRING PRESSURE SEAL

This invention relates to electrolytic cells in closed containers, and particularly to a cell with an alkaline electrolyte.

Electric cells that use an alkaline electrolyte, present problems in sealing the can in which the components of the cell including the electrolyte are contained. Leakage of the fluid electrolyte causes deterioration of the cell, and presents a deteriorated appearance which raises a doubt about the remaining life and value of the cell. The seal should therefore be completely leakproof as an ideal condition. This is sometimes difficult to accomplish when a molded plastic part serves as a compression closure to constitute the seal member. The compression seal experiences cold flow, thermal expansion, and many other effects that are characteristic of plastic materials, and thus may affect battery cells with plastic tops.

Various steps have been taken to form improved seals between the metal can and a molded body of plastic material to serve as a cell top seal member, by crimping the open end of the can container over the plastic member after the components of the cell have been disposed in the can and the top seal member placed in sealing position to receive the crimped end of the can.

The object of this invention is to provide a still better pressure seal than present current seals, by introducing a pressure generating element within the cooperating seal elements, that will compensate for any cold flow, thermal expansion, or other characteristics of plastic materials, that would otherwise affect the seal pressures and thereby change the operating conditions and effectiveness of the seal.

Another object of the invention is to provide a prestressed pressure producing spring element, such as a pre-stressed convolution or spring ring, as a permanent internal pressure element to press against a plastic ring whose outer surface is pressed against and by the crimped end of a container can within which the cell components are enclosed, thereby to establish a double-pressure seal, as compared to conventional single pressure seals.

Further, the pressure-generating element, which is resilient in its horizontal plane, is rigid in its vertical plane and serves as a rigid backplate against which the plastic seal can be additionally pressed to provide increased sealing effect.

Thus, a further object and feature of the invention is to provide a rigid reaction element within the crimping and sealing plastic body.

Another object is to provide such a rigid reaction element that is pre-stressed before disposition within the plastic body to establish a permanent sealing stress on a seal-functioning area of the sealing plastic body.

Still another object of this invention is to utilize the rigidity of the reaction spring element in a selected direction other than in its pre-stressed force plane to enable the rigid spring element to serve as a pressure-reaction element for additionally pressing a crimped-over portion of the plastic seal body.

In a preferred construction, as shown herein, the cylindrical can for containing the cell elements is provided with an internal peripheral bead that serves as a ring seat upon which a plastic closure top may seat. The top rim of the can is then peened over and pressed downward onto the plastic top to constitute a full closure within the can in the space above the bead. The end of the can, above the internal bead, when thus pressed inward and crimped over the peripheral border of the plastic top conventionally establishes a high pressure seal between the can and the plastic top.

However, due to temperature cycles and the cold flow characteristics of the plastic, battery cells that are not moved reasonably promptly in commerce may suffer some seal degradation. An improved seal thus permits longer shelf life, since the cell elements are otherwise not affected.

In accordance with the present invention, a pre-stressed reaction spring element is disposed in appropriate position to follow and compensate for any cold flow withdrawal movement of the plastic closure top. The border edge of the plastic closure top is shaped to provide a cylindrical extension integral with the plastic body to be pressed against by the peened-over end of the can in final steps of closure. A pre-stressed open spring convolution or ring, is disposed to rest against, and to impress a permanent radial pressure against, the inner surface of that cylindrical extension of the border of the plastic top. When the can is then peened over the outer border of the plastic, the plastic cylindrical extension is tightly compressed between the crimped portion of the can and the pre-stressed spring metal ring so that the pressure on both sides of the plastic cylindrical extension remains permanent in spite of any minor adjustments of the plastic top, due to cold flow, or thermal expansion and readjustments in response to any thermal or physical forces. The pressure induced by the crimped end of the can is then maintained against dissipation, by further pressure from an additional crimp force from the crimping end of an outer jacket that insulatingly surrounds the can of the cell.

Moreover, as an additional feature of the invention, the ring is utilized as a rigid reaction member against which the crimped end of an outer metal housing is pressed to impress an additional pressure force on the border portion of the plastic closure top.

The construction of a cell and of the seal of this invention as applied to the cell are described in more detail in the following specification, taken together with the accompanying drawings, in which FIG. 1 is a front elevational view of the cell, shown partially in elevation and partially in section, to expose the internal construction, and particularly of the seal;

FIG. 2 is a partial vertical sectional view of another modification of the seal;

FIG. 3 is a transverse vertical sectional view of a third modification of the plastic seal element with the internal pressure ring in place; and FIG. 4 is a schematically exploded view of a plastic seal element and the internal pressure ring.

As illustrated generally in the drawings, and in accordance with this this invention, an electric cell is provided with a plastic top closure seal of a suitable size and shape to fit snugly within the space defined at the top of the container can of the cell, and on a seating bead disposed near the top open end of the can. A portion of the seal closure is formed as a cylindrical plastic seal ring within which a pre-compressed spring metal ring is disposed to provide a permanent radial-pressure-producing element to co-operate with the can to mutually compress the plastic ring for maximum sealing effect. The spring metal ring serves an additional function of following any re-adjusting movement of the plastic seal ring due to cold flow or similar thermal re-adjustment. To achieve the increased sealing pressure of this invention, for cells of this type, the plastic top is provided with an axially extending integral border cylinder extending from the plastic body and is arranged to serve as a compressed seal element by the provision of the pre-stressed resilient metallic ring that is disposed against the inner surface of the border extension which is then subsequently compressed externally by the formation of a crimped edge of the container can of the cell. An external metal jacket is also crimped over to hold an electrode in place and additionally press the crimped edge of the container can.

As shown in FIG. 1, a typical cell 10, to which the invention is shown applied, comprises an anode electrode 12, extending downward into a mass of anode material 14, and provided with a supporting flat head structure 16 which serves as a support for a negative cap terminal 18 that is arranged to be welded during assembly to the head 16 of the anode electrode 12. Containing and surrounding the anode material 14 is a separator 20 that is surrounded by an annular cylindrical mass of depolarizer material 22 which rests against a metallic can 24 that serves as a container for the elements and ingredients of the cell.

The can 24 is normally closed at the bottom, and formed with a co-axial extension 26 that serves as one terminal of the cell when completed. The other end of the can 24 is initially open, and is formed to embody a cylindrical internal peripheral bead 28 which functions as a seat for a plastic top closure 30, which is coordinated with a resilient pre-compressed metal spring convolution ring 32, in accordance with this invention, for increased sealing effect, as will be described in more detail below.

After the elements and active ingredients of the cell are installed in place in the can 24, the plastic top closure 30 is inserted into the still open end of the can and placed upon the bead seat 28, with the relative dimensions such that the plastic top has a relatively snug friction fit with the still open portion of the can 24 above the bead seat 28, and with the bead seat 28.

In FIG. 1, one modification of the plastic top closure 30 is shown, and, for the cylindrical can 24, is generally of circular disc form, with a central body 34 having sufficient thickness to give the body a certain transverse rigidity as a solid element against subsequent compression or sealing. The central portion is given further strength and rigidity to withstand external stresses by the provision of a central axial hub 36 provided with an axial opening 38 through which the nail type anode 12 may be inserted into the open end of the container can 24. The lower end of the anode 12 is formed as a sharpened tip 40 to permit the anode element 12 to be easily pressure-inserted into the anode material 14.

The plastic top 30 is tapered slantingly downwardly and radially outward to serve the function of closing the separator bag 20 at the top by folding the top border edge portion 44 inwardly at the top edge of the bag, while at the same time maintaining sufficient contact with that border edge of the separator 20 to maintain the desired separation between the inner space 46 within the separator 20 and the outer space 48 which contains the depolarizer material.

The diameter of the plastic top 30, along its outer apron surface 50 is made such as to provide a snug sliding fit with the inner curved circle edge 52 of the bead 28. The plastic top 30 may be made of nylon or of any similar plastic material having the insulating qualities and strength and alkali resisting qualities found in nylon, with the feature of slight deformability and resilient reaction to deformation. The characteristics of cold-flow and variation in dimension in response to temperature cycles in nylon, appear to be inherent in other desirable plastic materials as well, so far available, and must therefore be compensated for in those undesirable features to obtain the desirable specific advantages available in the materials for those applications where the plastic material is otherwise satisfactory. In fact, the desirability of the nylon or other corresponding or equivalent plastic materials, that are otherwise suitable for this sealing purpose, have nevertheless introduced the problem for which the present invention is intended, namely to overcome those dimensional variations that are otherwise identified as cold flow and thermal cycle variations.

In conventional structures as made up to the present time, plastic tops similar to plastic top 30, here, have been provided with an axially short outer annular peripheral ring 54, over which the upper end of the can at 56 has been peened to provide a pressure seal between the peened over border edge 56 of the can and the outer peripheral ring 54 of the plastic top. Subsequent pressure applied to the top surface of the peened over end 56 of the can is additionally applied to hold the peened over can end from moving back and away from the peripheral plastic ring.

The special feature that constitutes and characterizes this invention is the provision and disposition of said pre-stressed convoluted metal spring ring 32 within the circular peripheral plastic ring of the plastic top 30 so that the pre-stressed metal spring pressure ring 32 will perform two pressure functions in establishing an improved sealing action between the plastic top and the can, first, against the can body, and second, against the peened over end 56 of the container can 24.

As is shown later in FIG. 4, the normal natural diameter of a convoluted metal spring ring such as 32 is originally greater than the normal natural diameter of the inner surface of the peripheral plastic ring 54 of the plastic top 30. In order to be able to place the metal spring pressure ring 32 readily into the space to fit within the internal diameter of the plastic sleeve 54, the outer diameter of the metal spring pressure ring 32 must be compressed to less than the inner diameter of the peripheral plastic sealing ring 54 of the plastic top 30. For that purpose the metal ring is convoluted, with slidingly engaged tapered ends, as shown in the modification in FIG. 4. As later indicated in FIG. 4, the metal spring ring 32 is compressed and prestressed, and is then seated in the annular peripheral plastic sealing ring 54 and permitted to re-expand until it engages the inner surface 84 of that plastic sealing ring 54. That plastic sealing ring 54 may bulge slightly on its outer surface, except as restrained by the metal can, and the sequence of assembly.

However, the pre-stressed metal spring pressure ring 32 still remains pre-stressed and will remain so throughout its life in the combination assembly in the battery cell. The spring is held against full expansion by the limited compression and cold flow or thermal adjustment of the plastic border sealing ring 54, and the reaction of the upper end of the can 24 above the bead seat 28, and thereby assures a high-pressure seal throughout the life of the cell.

After the compressed metal spring ring 32 has been placed in position, in the plastic sealing ring, the upper end of the can 56 is peened over to form the seal and such peening action also peens over the upper portion 86 of the plastic border sealing ring 54 onto the metal spring pressure ring 32.

Another feature of this invention is the function and utility of the prestressed convoluted metal spring pressure ring 32 as a rigid metal backing element against which the plastic sealing ring 54 can be pressed and compressed in and by the vertical part of the peening-over operation of the top can portion 56. The rigid metal spring ring 32 thus provides a substantial reaction pressure at the time of the peening-over action, and thereafter the pre-stressed force in the metal spring ring 32 remains permanently effective, during the life of the cell, to take up and compensate for any slight variation in the thickness of the plastic sealing ring 54, due to cold flow or to other thermal readjustments resulting from environmental temperature changes.

The utility of that second feature of the invention becomes further enhanced by the construction of the cell in which an insulating washer 60 rests on the peened-over top edge 56 of the metal can 24, and such washer 60 is subjected to top pressure by the pressure of an upper peened edge 64, of an outer metal jacket 66.

The two ends 64 and 68 of the outer metal jacket 66 are peened over, so that the body of the outer metal jacket 66 is substantially in tension and pulls on the peened-over ends to press on two outer insulating washers 70 and 74 at the respective ends of the cell.

After the top can edge 56 is peened over onto the plastic seal ring 54, the insulating washer 60 is positioned on the peened-over top can edge 56, and the upper end of the insulating plastic sleeve 72, between can 24 and jacket 66, is peened over and pressed down on the peened-over top can edge 56. The lower end of the plastic sleeve 72 at the bottom of cell 10 is also peened over the lower end of the can 24. The anode nail 12 with its negative cap 18 at the top of the cell are pressed home so the annular peripheral border 76 of the cap 18 will press down on the peened-over end of the plastic sleeve 72 on washer 60. The top insulating washer 74 and the bottom insulating washer 70 are placed in position and the two ends 64 and 68 of the outer metal jacket 66 are peened over tightly against those two washers 74 and 70.

The upper peened-over end 64 of the outer metal jacket 66 impresses a downward vertical pressure onto the washer 74, border 76 of cap 18, peened-over end of plastic sleeve 72, insulating washer, and onto the peened-over end 56 of the can 24, and then onto the peened-over upper end of the plastic sealing ring 54 down to and against the top surface of the rigid metal spring ring 32.

The metal spring ring 32 thus provides two desirable effects, first a radial compression force that acts in the horizontal plane, between the ring 32 and the can upper end to press the plastic sealing ring 54 between them as a pair of pincer pressure elements; and second, a vertical reaction to the compression force impressed on the upper end 86 of the plastic sealing ring 54 by the compression of the upper peened-over edge 64 of the outer metal jacket 66.

In FIG. 2 is shown another modification 30A of the plastic closure top in which a thicker apron 90 is provided for greater reaction support for the metal ring in a larger battery cell of this type. The seating of the closure top on the seating bead 28 is emphasized to show the sealing engagement over a substantial area. Thus, the pressure of the circular ring 32 can be made effective over substantially the entire half-circle of engagement between the circular ring and the sealing ring element of the closure 30A.

FIGS. 3 and 4 show another modification of a plastic closure top 100 in which the apron 102 is provided with a tapered surface feature 104 of the top and with the larger depending apron 106 to provide greater strength and greater reaction pressure for the metal ring 108, shown as a differently-shaped ring having a rectangular section, with its longer dimension in the plane of the reaction force exerted against the plastic sealing ring 54A. In the construction shown in FIGS. 3 and 4, the metal spring ring 108 provides a radial pressure directed outwardly due to its internal pre-stressed condition, with greater effectiveness due to the equivalent beam section strength effect, since the pressure is in this case effective in the plane of the long axis of the section. The spring pressure ring 108 is convoluted and provided with an inclined slot 109, at which the two ends can readily slide on each other when the ring 108 is compressed. The other feature and advantage here is the flat top surface 110 against which the upper end 112 of the plastic sealing ring 54A can be better pressed into confining and peened-over relationship, to be held by the can end as 56 in FIG. 1, and the other related pressure elements.

As impliedly shown in FIG. 4, the metal pressure ring 108 has an original natural diameter indicated by the outer broken lines on which opposed compression forces, indicated by the arrows, are impressed to compress the ring 108 to smaller diameter, as indicated, to fit down into the inner seating space on the floor of the closure 100 and within the internal diameter of the cylindrical plastic sealing ring 54A.

The invention has been described and disclosed particularly with reference to a type of cell in which proper sealing is of compelling importance, and the sealing as here disclosed, with multiply increased pressure over currently available pressures, has been very simply achieved by the simple concept of a pre-stressed element disposed internally within the sealing element so a pre-stressed force remains unabated and permanently active and effective within the cell throughout its life.

Variational dimensions may of course be made in the various elements without departing from the spirit and scope of the invention as described and claimed.

What is claimed is:

1. An electric cell, comprising
   a metallic can closed at the bottom and originally open at the top for insertion of the cell operating components, with said can having an internal peripheral bead formed around the can to serve as an internal seat for a top closure for the can;
   and a top closure for said can embodying a rigid circular plastic body extending across the full planar space within said seat bead, and said body having an integral resilient flexible compressible plastic ring as an extension of said rigid body and lying against the inner peripheral surface of said can above said bead;

and means for applying axial pressure force against said plastic ring in compression on said plastic ring to establish increased pressure sealing action for said cell can, said means for applying pressure forces including a pre-stressed metal spring ring element seated radially against the inner surface of said plastic ring and effective to impress an outward radial pressure in and against said plastic ring in a circular internal peripheral region around and within said plastic ring, above said bead, to maintain a constant pressure seal between said plastic ring and the inside surface of said can where engaged by said plastic ring.

2. An electric cell, as in claim 1, comprising
a cylindrical can as a container, having
an inwardly formed peripheral bead to serve as a seat for a top closure,
and a free open end cylindrical portion of said can originally extending co-axially upwardly from said seat;
a closure top for said can consisting of
an annular plastic body having a rigid central hub,
a relatively rigid annulus surrounding said hub and terminating in a
peripheral ring extending upwardly co-axially and concentrically to fit within said free open cylindrical portion of said can, said peripheral ring being relatively thin to permit and accept relatively simple and easy deformation with said can end portion in an ultimate closing operation during cell manufacture;
and wherein said stressed metal spring ring is disposed for peripherally engaging the inner surface of said plastic peripheral ring to press said plastic peripheral ring against said can extension above said seat, and said can extension and plastic peripheral ring being ultimately pressed radially inwardly to be peened over and to compress said metal spring ring, to establish pressure sealing and closure compression on both sides of said plastic peripheral ring.

3. A cell, as in claim 2, in which
said annular plastic body extends fully across the transverse diametrical area within said internal seat bead on said can, and embodies a depending portion that fits snugly diametrically within said seat bead;
and said spring ring is disposed at a level in said can than enables said spring ring to press said peripheral plastic ring peripherally and downwardly against said bead as a seat.

4. A cell, as in claim 3, in which
said peripheral plastic ring and said can extension are deformed concentrically radially inwardly around the central part of said plastic body progressively along the length of said spring metal ring.

5. An electric cell, as in claim 2, including, further,
an outer cylindrical jacket surrounding the can and insulated therefrom;
and means controlled by said jacket to impress a compression force on the peened over end of said can.

6. An electric dry cell, as in claim 5, in which
said jacket controlled means constitutes a peened over end of said jacket cylinder.

7. An electric cell, as in claim 2, including, further,
an annular pressure washer disposed co-axially to seat on the peened-over end extension of said can;
and means for impressing an axial pressure on said washer.

8. An electric cell, as in claim 7, in which
a metal cylindrical jacket concentrically surrounds and is insulated from said can;
and said jacket is peened over at one end to constitute said axial pressure means for said washer.

9. An electric cell, as in claim 8, in which
an anode electrode of nail shape extends axially down through said hub of said closure into the space within said can to engage related electrode material, and embodies a flat head piece;
a circular closure cap having a central co-axial area to seat on said head piece and electrically welded thereto to serve as a surface electrode, said cap having a circular annular border shaped and disposed to seat relatively congruently above the peened-over can end and insulated therefrom, with the peened-over end of said jacket pressing downward on said circular annular border.

10. An electric battery cell comprising
a cylindrical container can having one end originally open to receive the cell components;
an insulating closure for said can, said closure being insertable into said open end of said can and extending over substantially the entire internal sectional area of said can when inserted, and having a cylindrical sealing portion engaging the inner peripheral surface of said can over a limited axial length of said can;
and a metal ring disposed within said sealing portion for mutually reacting with said can against opposite surfaces of said sealing portion to establish a high-pressure sealing engagement between said sealing portion and the surface of the can engaged by said sealing portion.

11. An electric cell, as in claim 10, in which
said reacting pressure means embodies a resilient spring metal ring.

12. An electric cell, as in claim 10, in which
said reacting pressure means embodies a convoluted spring metal ring.

13. An electric cell, as in claim 10, in which
said reacting pressure means embodies a convoluted spring metal ring having parallel flat opposite side surfaces.

14. An electric cell, as in claim 12, in which
said spring metal ring is in pre-stressed compression to less-than-normal diameter when assembled within said sealing portion.

15. An electric cell, as in claim 14, in which
the edge of the open end of said can is peened over radially inward with the free circular edge of said sealing portion pressed over and onto said metal ring, while said metal ring serves as a rigid backing and is operative after assembly to serve as a permanent reaction pressure element to cooperate with said can in pressing said sealing portion to achieve a tight pressure seal against said can.

16. An electric cell, as in claim 10, in which
said reaction pressure means co-operate with said can to establish mutual pressures on said sealing portion in radial and in axial directions.

17. An electric cell, as in claim 1, in which said pressure-applying means serves to compress said plastic ring both against said bead and against the inner surface of said can.

18. In an electric cell having a metal can container for the components thereof, and a top plastic cover with a concentric resilient plastic cylindrical ring around the border of said plastic cover to seal against the inner surface of said can, the method of providing a high-pressure seal between said resilient ring and said can, which consists in disposing a compressed and pre-stressed reilient metal spring convoluted ring within said plastic cylindrical ring seal during assembly of the cell; and closing said cell with said metal spring ring in place to provide a permanent interior pressure within said plastic ring seal to press towards the can for the life of said cell.

* * * * *